(12) United States Patent
Oprisch

(10) Patent No.: US 6,880,665 B2
(45) Date of Patent: Apr. 19, 2005

(54) SAFETY DEVICE IN THE PEDAL REGION OF A MOTOR CAR

(75) Inventor: Christine Margarete Oprisch, Winzer (DE)

(73) Assignee: Edscha Betaetigungssysteme GmbH, Hengersberg (DE)

( * ) Notice: Subject to any disclaimer, the term of this patent is extended or adjusted under 35 U.S.C. 154(b) by 69 days.

(21) Appl. No.: 10/344,868

(22) PCT Filed: Jul. 27, 2001

(86) PCT No.: PCT/DE01/02694
§ 371 (c)(1),
(2), (4) Date: Feb. 14, 2003

(87) PCT Pub. No.: WO02/14129
PCT Pub. Date: Feb. 21, 2002

(65) Prior Publication Data
US 2003/0178240 A1 Sep. 25, 2003

(30) Foreign Application Priority Data
Aug. 17, 2000 (DE) .......................... 100 40 270

(51) Int. Cl.[7] .............................. B60R 21/02; B60T 7/06
(52) U.S. Cl. ....................... 180/274; 248/548; 248/900; 74/512
(58) Field of Search ..................... 180/274; 74/512, 74/560; 248/548, 900

(56) References Cited
U.S. PATENT DOCUMENTS 5,398,569 A * 3/1995 Carr .................. 74/512

6,290,018 B1 * 9/2001 Mebus .................. 180/274

FOREIGN PATENT DOCUMENTS

| DE | 4344386 | | 6/1995 | |
| DE | 19631868 | | 2/1998 | |
| DE | 19652014 | A1 * | 6/1998 | .......... B60K/23/00 |
| DE | 10016347 | | 10/2001 | |
| EP | 1031485 | | 8/2000 | |
| EP | 1074445 | | 2/2001 | |
| JP | 10226325 | | 8/1998 | |
| JP | 2000344064 | | 12/2000 | |

\* cited by examiner

Primary Examiner—Peter C. English
(74) Attorney, Agent, or Firm—Davidson, Davidson & Kappel, LLC

(57) ABSTRACT

A pedal support for a motor vehicle includes a first partial spindle, a second partial spindle, a clamp, a bracket connected to a crash-deformable bodywork part of the motor vehicle, and a stay in engagement with another part of the pedal support and connected to a crash-stable bodywork part of the motor vehicle. The bracket includes side walls, each having an outside. The first partial spindle and the second partial spindle are each mounted in one of said the walls and spaced apart in an axial direction. A spring force acts on the partial spindles in the axial direction. The clamp includes two parallel limbs, each limb being connected to one of the partial spindles and bearing against the outside of one of the side walls, such that a relative movement of the crash-deformable bodywork part to the crash-stable bodywork part urges the partial spindles away from each other so as to release a pedal supported by the partial spindles.

19 Claims, 3 Drawing Sheets

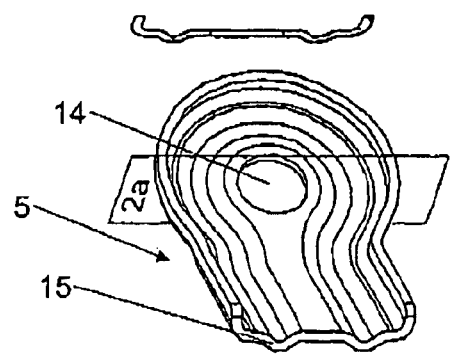
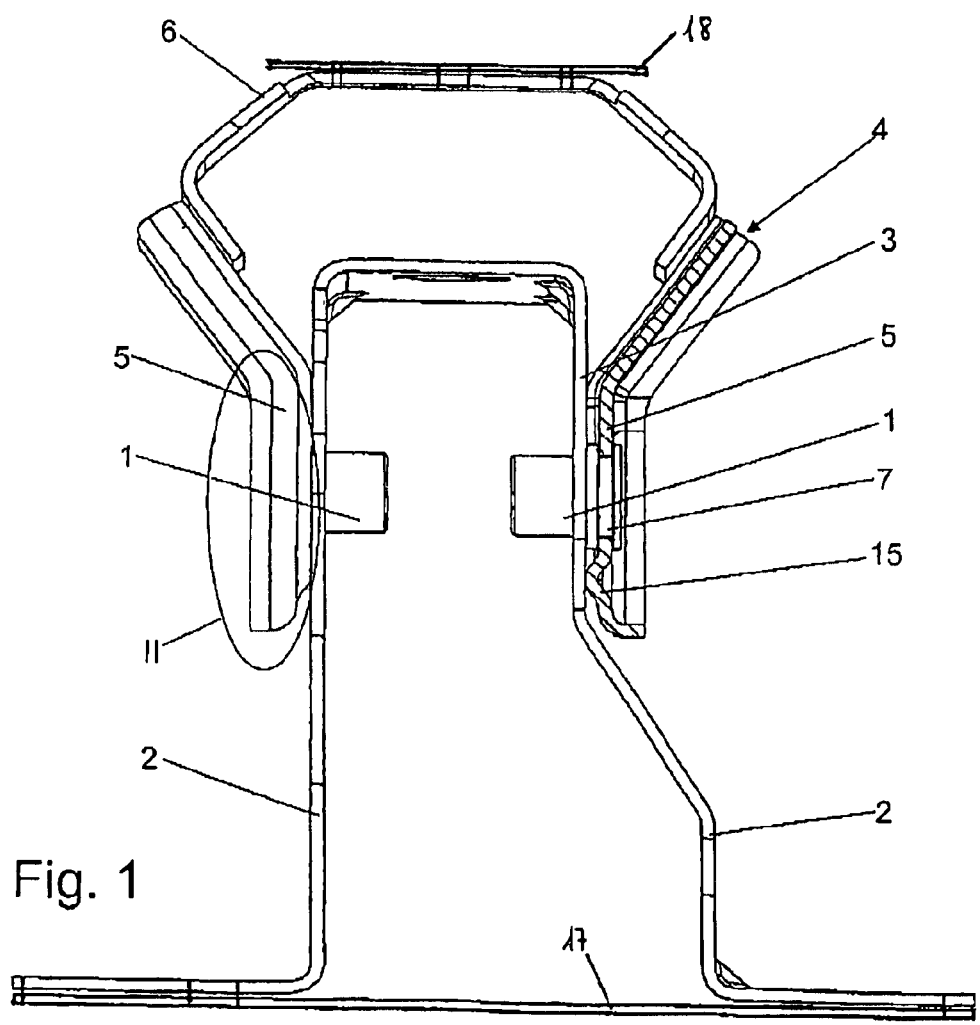

US 6,880,665 B2

SAFETY DEVICE IN THE PEDAL REGION OF A MOTOR CAR

BACKGROUND OF THE INVENTION

The invention relates to pedal supports for motor vehicles.

Pedal supports of this type are known in the prior art. German Patent Document DE 100 16 347.5 discloses a pedal support having a pedal spindle which has partial spindles spaced apart in the axial direction, and a bracket in which the pedal spindle is mounted in an enclosed manner, the pedal spindle, which consists of two half-spindles, alternatively being integrated on the pedal lever or bracket. In the case of pedal supports of this type, the bracket is usually fastened to the front splash wall of the bodywork, which wall partitions off the footwell in motor vehicles, which is also the structural space for pedal mechanisms, from the front in the direction of travel. The splash wall belongs to the bodywork parts, which, in the event of an accident, in particular a frontal crash, are at risk of deformation and are pressed into the footwell. There is thereby the risk of the bracket, which is fastened to the splash wall, and the pedal, which is mounted in it, being pressed in the direction of the driver's legs. There is thus an increased risk of injury to the driver's legs or feet.

A pedal support described at the beginning is known from German Patent Document DE 196 31 868 A1. An arrangement is disclosed therein for the mounting of a pedal lever which is arranged in a suspended manner and comprises a bracket, which is fastened to the splash wall of a motor vehicle, and two longitudinal struts whose inner sides contain bearing stubs on which the pedal spindle, which is of hollow design, is placed. Furthermore, an expanding device is provided which is designed, for example, as a wedge with sliding surfaces and supporting points for the wedge at the footwell-side ends of the struts. In the event of a collision, the support points slide along the sliding surfaces, as a result of which the longitudinal struts are pressed apart and the spindle stubs are pulled out of the hollow spindle, so that the pedal spindle can yield downward.

German Patent Document DE 42 44 386 A1 discloses a pedal mechanism for a vehicle, which has a pedal strut having two strut limbs which are arranged at a distance from each other and between which a pedal is pivotably mounted, a pedal spindle being inserted by its two ends into spindle bearings which are open toward the pedal spindle, and the pedal strut being provided in the region of its two ends with sockets for fastening the pedal mechanism between stationary components of the vehicle. Each strut limb has a region of deformation, the spindle bearings, which are connected to the strut limbs, being disengaged from the pedal spindle on exceeding a force, which is introduced into the pedal strut via at least one of the stationary components. It is ensured by the pedal being disengaged that, in the event of a collision, a risk of injury to the driver is largely eliminated.

SUMMARY OF THE INVENTION

An object of the present invention is to provide a pedal support described at the beginning in such a manner that the pedal support is simple, is constructed from few parts and is functionally reliable during normal operation and, in the event of a crash, the risk of injury to the driver due to displaced pedals protruding into the footwell is avoided or at least reduced.

The present invention provides a pedal support for a motor vehicle. The pedal support includes a first partial spindle, a second partial spindle, a clamp, a bracket connected to a crash-deformable bodywork part of the motor vehicle, and a stay in engagement another part of the pedal support and connected to a crash-stable bodywork part of the motor vehicle. The bracket includes side walls, each having an outside. The first partial spindle and the second partial spindle are each mounted in one of said side walls and spaced apart in an axial direction. A spring force acts on the partial spindles in the axial direction. The clamp includes two parallel limbs, each limb being connected to one of the partial spindles and bearing against said outside of one of said side walls, such that a relative movement of said crash-deformable bodywork part to said crash-stable bodywork part urges said partial spindles away from each other so as to release a pedal supported by said partial spindles.

Stariting from the pedal support described at the beginning, this problem is solved by a pedal support having the combination of features according to claim 1.

A pedal support of this type has the advantage that it is simple, consists of few parts, can easily be fitted and is functionally reliable during normal operation, the partial spindles of the pedal spindle being released from their mounting in the bracket in the event of the bodywork part to which the bracket is fastened being deformed into the footwell, with the result that the pedal, which has been cast loose, can fall onto the floor of the footwell. This substantially reduces the risk of injury to the driver of the motor vehicle in the event of a crash, in particular of a frontal impact.

At least one tensioned compression spring may be arranged in the axial direction between the partial spindles and bears against the inner end surfaces of the partial spindles, that the parallel limbs of the clamp are connected fixedly to the stay, and at their end protruding outward over the side walls of the bracket, the partial spindles have a thickened end which, together with the parallel limbs, forms a device for the releasable fixing of the partial spindles to the limbs. In this arrangement, in the event of a deformation of the splash wall into the footwell, the fixing of the partial spindles is released, so that the spring force acting in the axial direction can eject the partial spindles from the mounting in the bracket.

Alternatively, the parallel clamp limbs may be resilient and, to the rear, in the deformation direction, of the connecting point to the partial spindles, may be bent obliquely to the bracket side walls in a manner such that they diverge in the shape of a V and bear against end sides of those end sections of the stay which are arranged in the same direction and run in a complementary manner to the clamp limbs. This solution functions in such a manner that, when the splash wall is deformed into the footwell, the bracket and with it the partial spindles which are mounted in an enclosed manner, are displaced in the deformation direction, while the stay, which is fastened to a crash-stable bodywork part, remains fixed in position and the clamp limbs moving toward it expands outward counter to the spring action and in the process pulls the partial spindles out of their enclosed mounting until the partial spindles are free.

In another embodiment, the bead-shaped bulge of the clamp limbs has the effect that the clamp limbs are arranged at a distance from the side walls of the bracket. The distance should correspond at least to the length of the thickened end of the partial spindles. This ensures that the partial spindles are held perpendicular with respect to the side walls of the bracket and do not tilt. The bead-shaped bulge moreover has the advantage that it has a stiffening effect on the resilient clamp limbs and reduces the frictional forces owing to the reduction in size of the contact surfaces.

BRIEF DESCRIPTION OF THE DRAWINGS

The advantages mentioned and further advantages will be explained in the further description of exemplary embodiments, which are illustrated in the attached drawing.

FIG. 1 shows a pedal support in the initial state in a view from below.

FIG. 2 shows an end section of a clamp according to the detail II in FIG. 1, in a perspective illustration.

FIG. 2a shows a cross-section of the end section of the clamp denoted by the section plane 2A in FIG. 2.

DETAILED DESCRIPTION

Figure 3:
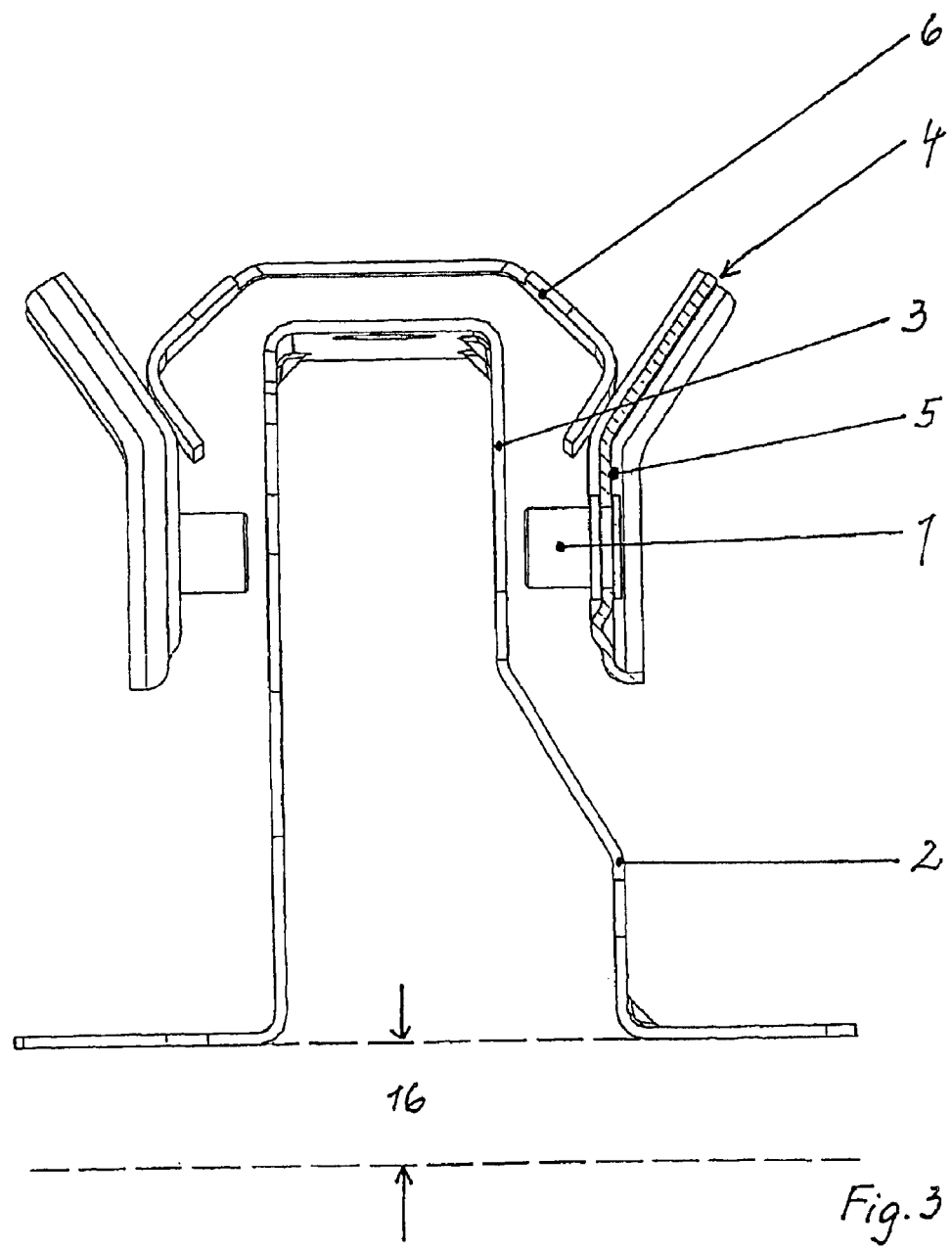
FIG. 3 shows the pedal support according to FIG. 1, but in a pressed-in state after a crash.

The pedal support which is illustrated in FIG. 1 comprises partial spindles 1 and a bracket 2 which is fastened by means of lower limbs bent at right angles to a crash-deformable bodywork part, for example to the front splash wall 17 in front of the footwell of a motor vehicle. The partial spindles 1 are mounted in an enclosed manner in the bracket 2. The partial spindles 1 are fastened to the parallel limbs 5 of a resilient clamp 4. Those parts of the clamp 4 which are arranged on the right and left of the bracket 2 are connected by a part (not illustrated) of the clamp 4 in such a manner that the parallel limbs 5 bear in a prestressed manner against the outside of the side walls of the bracket 2. The connecting part may, for example, run above or below the plane of projection. The fastening of the partial spindles 1 to the parallel limbs 5 can take place in a variety of ways, for example by riveting, welding or securely clamping. The partial spindles 1 are fastened to the thickened ends 7 which are arranged on the outside of the bracket 2. Those sections of the partial spindles 1, which protrude opposite into the interior of the bracket 2, are arranged perpendicular to the side walls of the bracket 2 and are aligned with one another.

In a viewing direction from the fastening limbs of the bracket 2, and therefore in the deformation direction in the event of a crash, behind the connecting point to the partial spindles 1, the parallel limbs 5 are bent obliquely to the side walls of the bracket 2 in a manner such that they diverge in the shape of a V. Those sections of the clamp 4 which are bent in the shape of a V bear against end sides of a stay 6. This stay 6 is fastened to a crash-stable bodywork part, for example to a crossmember 18. The sections of the stay 6, against which those sections of the clamp 4, which are bent in the shape of a V bear, run in the same direction. The two sections bearing against each other of clamp 4 and stay 6 are formed in a complementary manner. In this view from below, in the upper region of the illustration of the stay 6, a section of the stay 6 can be seen, which has a smaller height than its neighboring sections. This offset in height is intended to ensure that, in the event of a crash-induced deformation, the bracket 2 does not strike against the stay 6, but rather can move through below the latter.

The functioning of the pedal support in the event of a crash is envisaged in such a manner that, when the splash wall is deformed, the latter, and therefore the bracket 2 which is fastened to it, moves in the direction of the stay 6. Since the partial spindles 1 are mounted in an enclosed manner in the bracket 2 and are fastened to the parallel limbs 5 of the clamp 4, the clamp 4 is also moved in the same direction. Since those sections of the clamp 4 which are bent in the shape of a V bear against the end surfaces of the parallel end sections of the stay 6, which is fastened to a crash-stable bodywork part, the parallel limbs 5 of the clamp 4 spread apart during this forward movement. As soon as this expansion exceeds the length of those sections of the partial spindles 1, which project into the interior of the bracket 2, the partial spindles 1 are released from the mounting in the bracket 2.

As soon as the partial spindles 1 are removed from the mounting and no longer protrude into the interior of the bracket 2, the pedal lever (not illustrated) which is mounted on the partial spindles 1 no longer has any support and falls freely into the footwell of the motor vehicle. As a result, the crash-induced risk of injury to the driver due to pedal lever projecting into the footwell is eliminated.

FIG. 2 illustrates an end section of the parallel limbs 5, which approximately corresponds to the detail II in FIG. 1, in a perspective view. The side edges of the parallel limb 5, which is illustrated here, are bent over vertically upward. The end of the limb 5 is rounded and, in the center of this rounded end, has a connecting hole 14 which is suitable for the fastening, for example for the riveting, of the thickened end of the partial spindles 1. A bead-shaped bulge 15 which runs around the connecting hole 14 on at least three sides runs parallel to the edges. The bead-shaped bulge has a stiffening effect on the resilient clamp limbs.

With reference to the illustration in FIG. 2, the design of clamp 4 and parallel limb 5, which is illustrated cut away on the right-hand side of the illustration in FIG. 1, is readily comprehensible. The clamp 4 bears with the crests of the bead-shaped bulge 15 against the outside of the side walls of the bracket 2 and against the end surfaces of the bent ends of the stay 6. By means of the minimal contact surface between the crests and the supporting surfaces, the frictional force between the parts is correspondingly reduced. In the exemplary embodiment illustrated, the height of the bead-shaped bulge 15 is selected in such a manner that it is larger than the thickness of that part of the thickened end of the partial spindles 1 which bears against the bracket 2. As a result, a tilting of the partial spindles 1 is avoided by the parallel limbs to which the partial spindles 1 are fastened and which, because of their prestress, press against the outer side walls 3 of the bracket 2. This is important insofar as tilting of this type could lead to jamming when pulling the partial spindles 1 out of their enclosing mounting in the bracket 2.

In FIG. 3, the pedal support according to FIG. 1 is illustrated in a position as results after a crash-induced deformation of the bodywork part to which the bracket is fastened. The splash wall, which is indicated by dashed lines, to which the bracket 2 is fastened by its vertically angled limbs, has been displaced, in the case illustrated, in the direction of the stay 6 by the crash-induced deformation path 16. By means of this displacement, the clamp 4, and therefore its parallel limbs 5, is spread apart to such an extent that the partial spindles 1 are released from their enclosing mounting in the bracket 2. The pedal lever, which has previously been mounted on those sections of the partial spindles 1, which project into the interior of the bracket 2, therefore loses its support and can move freely. It falls to the floor of the footwell and no longer protrudes, fastened to the bodywork, into the footwell.

Figure 4:
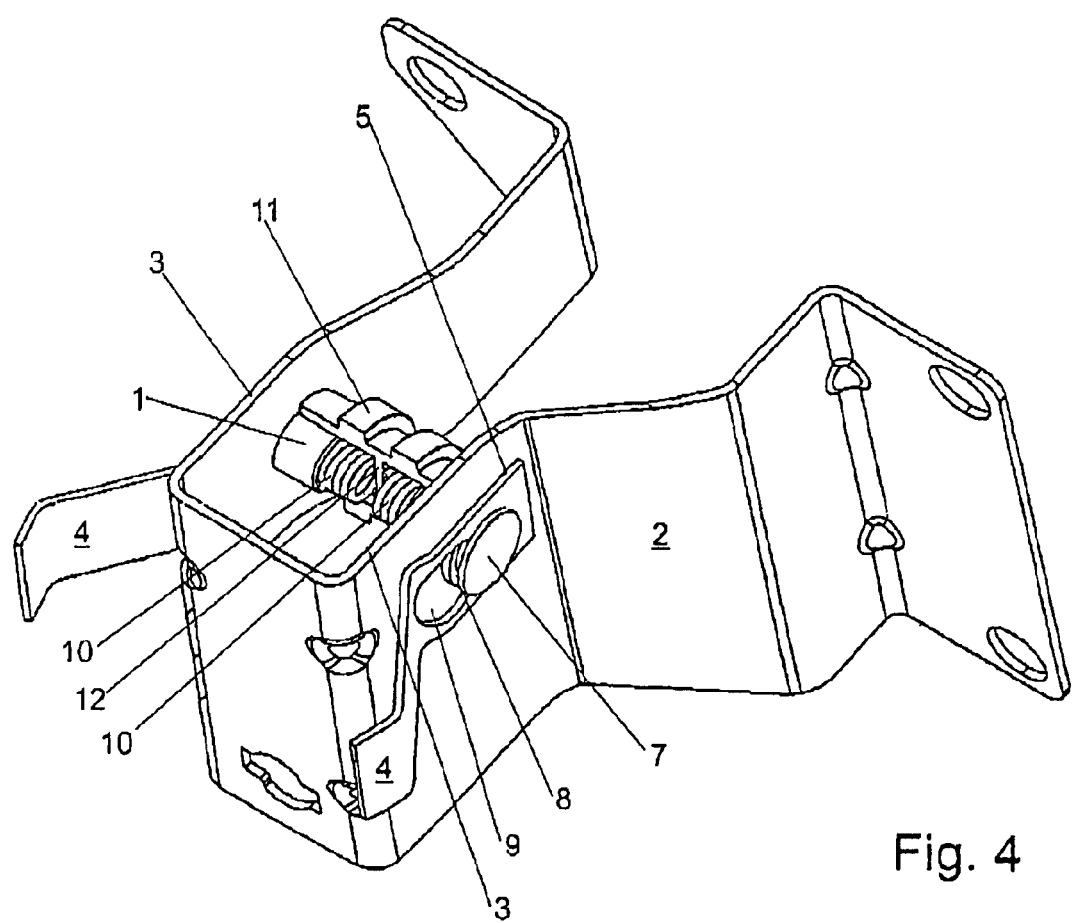
FIG. 4 shows another embodiment of a pedal support, in a perspective illustration.

Another embodiment of a pedal support according to the invention is illustrated in FIG. 4. In this case, the thickened ends of the partial spindles 1 have a circumferential groove 8 which is arranged parallel to the side walls 3 of the bracket 2. The parallel limbs 5 each have, transversely to the axial direction, an opening 9 which has the form of two circles which differ in diameter, are situated one behind the other in a crash-induced deformation direction and half overlap peripherally. In this arrangement, the diameter of the semicircle which lies in front in the deformation direction corresponds to the diameter of the base of the groove, and the diameter of the circle lying behind it corresponds at least to the outside diameter of the thickened end of the partial spindle 1. In the initial state before a crash-induced deformation, the partial spindle 1 is fixed with its groove 8 in the smaller opening circle. Two compression springs 10 are arranged one behind the other between the partial spindles 1, said compression springs being separated by an internal web 12 of a bearing tube 11, which web runs parallel to the inner end surfaces of the partial spindles 1, and are supported on said internal web. The bearing tube 11 of the pedal extends between the side walls 3 of the bracket 2 and is mounted on those sections of the partial spindles 1 which project into the bracket 2. The clamp 4 is connected integrally to the stay 6 (not illustrated) which is fixed to a crash-stable bodywork part.

In the initial position before a crash, the partial spindles 1 are fixed to the parallel limbs 5, which bear fixedly against the side walls 3 of the bracket 2, by being attached with their circumferential grooves 8 in the smaller semicircles of the openings 9. In this exemplary embodiment, the parallel limbs 5 of the clamp 4 are either stiff or have a spring resistance which is much higher than the compression springs 10. As a result, the partial spindles 1, which are prestressed by the compression springs 10, are held in this position as long as the grooves 8 are latched firmly in the smaller semicircles. If a crash-induced deformation of the splash wall (not illustrated), and hence a movement of the bracket into the footwell of the motor vehicle, then occurs, the bracket 2 with its enclosing mounting of the partial spindles in the side walls 3 carries the pedal spindle forward with it. As a result, the partial spindles 1 are displaced forward within the openings 9 to such an extent that the thickened ends are now positioned in the parts of the openings whose diameter corresponds at least to the outside diameter of the thickened ends. As a result, the fixing of the partial spindles 1 to the parallel limbs 5 is neutralized and the partial spindles 1 can be pushed outward by the prestressed compression springs 10, so that sections of the partial spindles 1 no longer protrude into the interior of the bracket between the side walls 3. So that the support of the pedal bearing tube 11 is dropped out and is therefore freely movable. In such a case, it will fall onto the floor of the footwell and will no longer protrude into the footwell.

What is claimed is:

1. A pedal support for a motor vehicle, the pedal support comprising:
   a first partial spindle and a second partial spindle, wherein the first partial spindle and the second partial spindle are spaced apart in an axial direction, a spring force acting on said partial spindles in said axial direction;
   a bracket connected to a crash-deformable bodywork part of the motor vehicle, wherein said bracket is provided with side walls, each side wall comprising an outside, wherein said first partial spindle and said second partial spindle are each mounted in one of said side walls;
   a stay connected to a crash-stable bodywork part of the motor vehicle, wherein said stay is in engagement with another part of the pedal support; and
   a clamp comprising two parallel limbs, each of said limbs being connected to one of said partial spindles and bearing against said outside of one of said side walls of said bracket, such that a relative movement between said crash-deformable bodywork part and said crash-stable bodywork part due to a frontal crash of the motor vehicle urges said partial spindles away from each other so as to release a pedal supported by said partial spindles.

2. The pedal support as recited in claim 1, wherein the two partial spindles include facing inner end surfaces and further comprising at least one compression spring disposed between said partial spindles in said axial direction, said compression spring bearing against said facing inner end surfaces, wherein said two parallel limbs of said clamp are connected fixedly to said stay, wherein said partial spindles comprise thickened ends protruding outwardly from said side walls of said bracket, and wherein said thickened ends together with said parallel limbs form a device for releasably fixing said partial spindles on said limbs.

3. The pedal support as recited in claim 2, wherein each of said thickened ends of said partial spindles includes a circumferential groove arranged parallel to said side walls, wherein each of said limbs comprises an opening, each opening formed by
   a first circle and a second circle which differ in diameter, wherein the first circle and the second circle are situated one behind the other in a crash-induced deformation direction and partially overlapping peripherally, such that a first partial circle and second partial circle are formed, wherein one of said first partial circle and said second partial circle is arranged in front in the crash-induced deformation direction and having a diameter corresponding to a diameter of a base of said grooves, wherein another of said first partial circle and said second partial circle has a diameter corresponding at least to an outside diameter of said thickened ends of said partial spindles, and
wherein each of said grooves of said partial spindles is arranged in each said first partial circle in one of said openings.

4. The pedal support as recited in claim 3, further comprising a pedal including a bearing tube having at least one internal web disposed parallel to said inner end surfaces and wherein the at least one compression spring includes compression springs arranged in tandem between said two partial spindles, said compression springs being separated and supported by the at least one internal web.

5. The pedal support as recited in claim 1, wherein said limbs are resilient, wherein said stay includes end sections, the end sections including end sides, and wherein said clamp bears against said end sides.

6. The pedal support as recited in claim 5, wherein a connection points for said parallel limbs of said clamp with said partial spindles are provided and wherein said clamp is bent to the rear, in a deformation direction, of said connection points obliquely to said side walls of said bracket in a manner such that said clamp diverges.

7. The pedal support as recited in claim 6, wherein said parallel limbs of said clamp include edges and bead-shaped bulges running parallel to said edges, and wherein said bead-shaped bulges surround said connection points on at least three sides.

8. The pedal support as recited in claim 1, wherein said crash-deformable bodywork part is a front splash wall.

9. The pedal support as recited in claim 1, wherein said crash-stable bodywork part is a cross-member.

10. A pedal support for a motor vehicle, the pedal support comprising:

a first spindle member disposed in a bracket connected to a crash-deformable bodywork part;

a stay connected to a crash-stable bodywork part engaging at least a first limb of a resilient clamp, wherein said first limb is coupled with said first spindle member; and wherein said stay urges said first limb to displace said first spindle member out of said bracket when said crash-deformable bodywork part is displaced with respect to said crash-stable bodywork part due to a frontal crash.

11. The pedal support as recited in claim 10, further comprising a second spindle member disposed in said bracket, and wherein said stay engages a second limb of said resilient clamp and said second limb is coupled to said second spindle member.

12. The pedal support as recited in claim 11, wherein said first spindle member and said second spindle member each include a thickened end and are disposed in facing holes of said bracket, and wherein said first limb and said second limb are disposed at outer surfaces of said bracket and are each connected to one of said thickened ends.

13. A pedal support for a motor vehicle, the pedal support comprising:

a first spindle member disposed in a bracket having a thickened end and a distal end surface;

a spring member bearing against said distal end surface and prestressing said first spindle member outwardly of the bracket;

a first limb holding said first spindle member engaged with said bracket in an operating condition, said first limb being connected to one of a crash-stable bodywork part and a crash-deformable bodywork part, wherein said bracket is connected to the other of the crash-stable bodywork part and the crash-deformable bodywork part, and wherein said spring member causes said first spindle member to be expelled out of the bracket when a relative movement between said crash-stable bodywork part and said crash-deformable bodywork part exceeds a threshold value due to a frontal crash condition of the motor vehicle.

14. The pedal support as recited in claim 13, wherein said first limb comprises an opening formed by a small circular opening overlapping a large circular opening, wherein in the operating condition said thickened end of said first spindle member is immobilized in an axial direction in said small circular opening, and wherein in the frontal-crash condition said thickened end is radially displaced into said large circular opening.

15. The pedal support as recited in claim 14, wherein said thickened end includes a circumferential groove having a base, wherein a diameter of said small circular opening corresponds to a diameter of said base, and wherein a diameter of said large circular opening corresponds at least to an outside diameter of said thickened end.

16. The pedal support as recited in claim 15, wherein said small circular opening is arranged in front of said large circular opening in a deformation direction, and wherein due to said relative movement said first spindle member is displaced from said small circular opening into said large circular opening, such that said spring member can expand and expel said first spindle member out of the bracket.

17. The pedal support as recited in claim 13, further comprising a second spindle member disposed in said bracket and a second limb holding said second spindle member engaged with said bracket, said second spindle member having a thickened end and a distal end surface, wherein said spring member is disposed between said distal end surfaces of said first and second spindle members.

18. The pedal support as recited in claim 13, wherein said crash-deformable bodywork part is a front splash wall.

19. The pedal support as claimed in claim 13, wherein said crash-stable bodywork part is a cross-member.

* * * * *